(12) United States Patent
Wilairat

(10) Patent No.: US 8,751,956 B2
(45) Date of Patent: Jun. 10, 2014

(54) VARIABLE RATE SCROLLBAR

(75) Inventor: Weerapan Wilairat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 964 days.

(21) Appl. No.: 12/472,608

(22) Filed: May 27, 2009

(65) Prior Publication Data
US 2010/0306648 A1    Dec. 2, 2010

(51) Int. Cl.
*G06F 3/048* (2013.01)

(52) U.S. Cl.
USPC ......................................... 715/786

(58) Field of Classification Search
USPC ................... 715/786-787, 863-864
See application file for complete search history.

(56) References Cited

U.S. PATENT DOCUMENTS

| | | | |
|---|---|---|---|
| 6,380,953 B1 | 4/2002 | Mizuno | |
| 7,328,411 B2 * | 2/2008 | Satanek | 715/786 |
| 7,479,949 B2 * | 1/2009 | Jobs et al. | 345/173 |
| 7,676,759 B2 * | 3/2010 | Carter | 715/783 |
| 7,877,708 B2 * | 1/2011 | Zinn et al. | 715/864 |
| 2005/0022130 A1 * | 1/2005 | Fabritius | 715/739 |
| 2005/0165740 A1 | 7/2005 | Kerr et al. | |
| 2005/0210403 A1 * | 9/2005 | Satanek | 715/786 |
| 2005/0257166 A1 | 11/2005 | Tu | |
| 2006/0184901 A1 * | 8/2006 | Dietz | 715/855 |
| 2007/0143705 A1 | 6/2007 | Peters | |
| 2007/0157112 A1 | 7/2007 | Peters | |
| 2008/0165149 A1 * | 7/2008 | Platzer et al. | 345/173 |

OTHER PUBLICATIONS

McCrickard, et al., "Beyond the Scrollbar: An Evolution and Evaluation of Alternative Navigation Techniques", Retrieved at <<http://ieeexplore.ieee.org/stamp/stamp.jsp?tp=&arnumber=795913&isnumber=17255>>, May 8, 2009, pp. 8.

Laakso, et al., "Improved Scroll Bars", Retrieved at <<http://citeseerx.ist.psu.edu/viewdoc/download?doi=10.1.1.129.1933&rep=rep1&type=pdf>>, CHI 2000 Extended Abstracts (Conference on Human Factors in Computing Systems), ACM, New York, 2000, pp. 2.

Crowley, et al., "Things That See", Retrieved at <<http://reference.kfupm.edu.sa/content/t/h/things_that_see_613997.pdf>>, Mar. 2000, vol. 43, No. 3, Communications of the ACM, pp. 54-64.

McGee, Marilyn Rose, "A Haptically Enhanced Scrollbar: Force-Feedback as a Means of Reducing the Problems Associated with Scrolling.", Retrieved at <<http://citeseerx.ist.psu.edu/viewdoc/download?doi=10.1.1.70.2493&rep=rep1&type=pdf>>, pp. 4.

* cited by examiner

*Primary Examiner* — Thanh Vu

(74) *Attorney, Agent, or Firm* — Sung Kim; Andrew Sanders; Micky Minhas

(57) ABSTRACT

Embodiments of a variable rate scrollbar are described. In various embodiments, media items, such as email messages, text messages, digital photos, or song selections are grouped by a page, a day, a week, or a month that corresponds to a date associated with a media item. A list of the media items is displayed from one of the groups, and the media items that are displayed are selectable from the list. A variable rate scrollbar is displayed and configured for selection to navigate the media items at variable rates according to the groups of the media items.

18 Claims, 4 Drawing Sheets

VARIABLE RATE SCROLLBAR

BACKGROUND

Portable computer devices are increasingly more common and mobile, such as laptop computers, tablet PCs, ultra-mobile PCs, as well as other mobile data, messaging, and/or communication devices. When a user holds a small, portable device such as a tablet PC or ultra-mobile PC that has an integrated touch-screen, a common interaction technique is to hold the device with one hand and interact with the touch-screen with fingers of the other hand. For example, users can tap-touch targets, user interface elements, or menu items on the touch-screen with a finger. While portable computer devices have become more mobile and convenient, the size of device integrated displays has decreased to accommodate the mobility and convenience of the devices. Many users of portable devices utilize email as a main source of communication and often accumulate hundreds of emails, but can only view a few emails at any one time on a small display. This can make it difficult for a user to scroll or otherwise navigate through many emails, particularly past emails that may have been received in past days, weeks, and/or months.

SUMMARY

This summary is provided to introduce simplified concepts of a variable rate scrollbar. The simplified concepts are further described below in the Detailed Description. This summary is not intended to identify essential features of the claimed subject matter, nor is it intended for use in determining the scope of the claimed subject matter.

Embodiments of a variable rate scrollbar are described. In various embodiments, media items, such as email messages, text messages, digital photos, or song selections are grouped by a page, a day, a week, and/or a month that corresponds to a date associated with a media item. A list of the media items is displayed from one of the groups, and the media items that are displayed are selectable from the list. A variable rate scrollbar is displayed and configured for selection to navigate the media items at variable rates according to the groups of the media items.

In other embodiments, a portable computer device implements a variable rate scrollbar configured for selection to navigate messages that are grouped by a page, a day, a week, and/or a month that corresponds to a date when a message is received. A touch-screen of the portable computer device displays a list of the messages from at least one of the groups. A scrollbar application initiates a display of the variable rate scrollbar to navigate the messages at variable rates according to the groups of the messages. A touch-screen driver can detect an input to the variable rate scrollbar as an individual navigation of the messages when displayed from at least one of the groups, and further, can detect that the input is continued to vary a scrolling rate of the variable rate scrollbar to initiate a display of a different group of the messages.

BRIEF DESCRIPTION OF THE DRAWINGS

Embodiments of a variable rate scrollbar are described with reference to the following drawings. The same numbers are used throughout the drawings to reference like features and components.

DETAILED DESCRIPTION

Embodiments of a variable rate scrollbar provide techniques for a user of a portable device to scroll a display of media items, such as a list of email messages, text messages, digital photos, song selections, or any other type of media items that are listed for user selection. A variable rate scrollbar provides individual navigation of media items, such as email messages, that are displayed and grouped according to any of a page for the current day, a past day, a week, and/or a month. The variable rate scrollbar also provides for variable group navigation to initiate a display of a different grouping of the email messages (e.g., a different past day, a week, or a month). The scrolling rate, or how fast a user can scroll media items, is changed or varied based on how a user can select individual media items, such as in a page view of the email messages, and then jump to select a group of the email messages from a past day, a week, or a month. A user can change the scrolling rate of a variable rate scrollbar without lifting the contact of a touch input on a touch-screen of a portable device. Additionally, when a group of media items is selected, a user can then individually navigate the media items that are associated with the selected group of media items.

While features and concepts of the described systems and methods for a variable rate scrollbar can be implemented in any number of different environments, systems, and/or various configurations, embodiments of a variable rate scrollbar are described in the context of the following example systems and environments.

Figure 1:
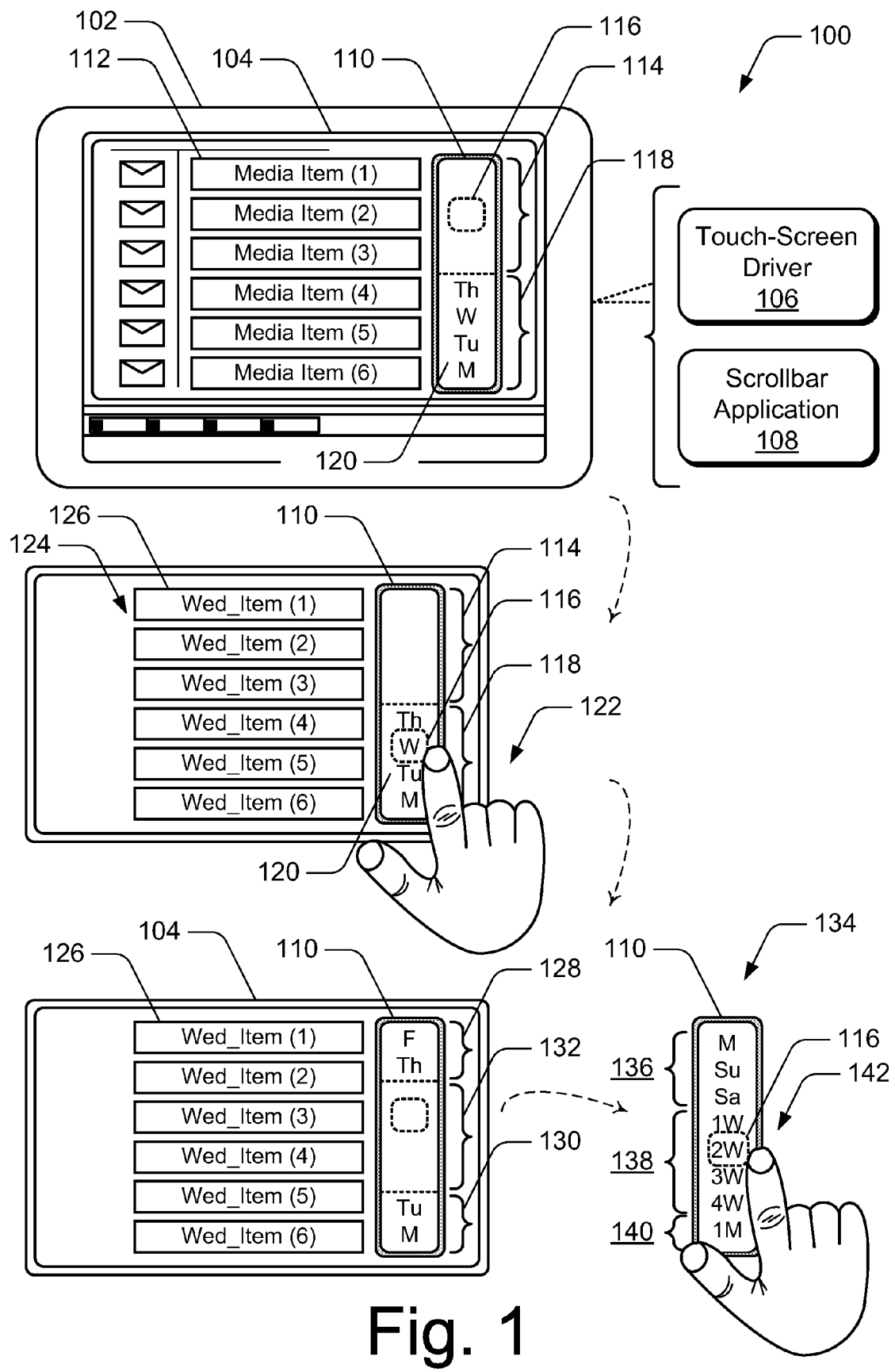
FIG. 1 illustrates an example of a portable computer device that can implement various embodiments of a variable rate scrollbar.

FIG. 1 illustrates an example 100 of a portable device 102 that can implement various embodiments of a variable rate scrollbar. Portable device 102 is an example of any of the various types of portable devices described with reference to FIG. 2 and can also be implemented with any number and combination of differing components as described with reference to the example device shown in FIG. 4. Portable device 102 includes an integrated touch-screen 104 to display user interfaces, user interface elements and features, user-selectable controls, various displayable objects, and the like. Portable device 102 also includes at least a touch-screen driver 106 and a scrollbar application 108 to initiate display of a variable rate scrollbar 110 and the various user interface elements, features, and controls.

In various implementations, the portable device 102 can be utilized as a music and/or video player, for email communication, text messaging, as a photo viewer, as a portable phone for voice communication, and/or for many other applications. In this example, portable device 102 includes a display of media items 112, which may be a list of email messages, text messages, digital photos, song selections, or any other type of media items that are listed for user selection. The portable device 102 includes a memory to store groups of the media items that are grouped by a page, a day, a week, and/or a month that corresponds to a date associated with a media item. For example, email messages and text messages can be grouped by the date when an email message or text message is received. Similarly, digital photos may be grouped by the date when a photo is taken and song selections may be grouped by the date when a song is downloaded.

In an embodiment, the scrollbar application 108 initiates a display of the variable rate scrollbar 110 on the touch-screen 104 for user selection or manipulation to navigate the media items at variable rates according to the groups of the media items. A user can navigate the list, or a partial list, of the media items 112 that are displayed on the touch-screen 104. In this example, the list of media items 112 are email messages displayed in a page view of the email messages (e.g., shown as media items 1-6) that have been received on the current day (i.e., the current day is represented as a Friday in this example). The list of the email messages can be scrolled to display subsequent pages of additional email messages that are also received on the current day.

The variable rate scrollbar 110 includes an individual navigation region 114 that a user can select and/or manipulate for individual navigation of the email messages that are displayed in the list, such as in the page view for the list of the media items 112. In this example, the individual navigation region is shown as approximately fifty-percent (50%) of the variable rate scrollbar 110, although the region may be implemented as any size or percentage of the scrollbar to accommodate user selection, such as with finger or thumb touch inputs to the touch-screen 104. The variable rate scrollbar 110 can include a position indicator 116 that indicates where a user interacts with the variable rate scrollbar 110. For example, the position indicator 116 is shown displayed in the individual navigation region 114 which indicates to a user that the list of email messages is scrolled from the page group to display subsequent pages of additional email messages that are also received on the current day.

The variable rate scrollbar 110 also includes a group navigation region 118 that a user can select and/or manipulate for group navigation to initiate the display of a different group of the email messages. The variable rate scrollbar 110 includes identifiers 120 of the groups of email messages. In this example, the group navigation region 118 includes identifiers of the consecutive previous days on which email messages have been received. In this example, the current day is represented as a Friday, and the consecutive previous days are Thursday, Wednesday, Tuesday, and so on as indicated by the identifiers 120 (e.g., Th, W, Tu, M, Su, Sa for the days of the current week).

An identifier in the group navigation region 118 is selectable to initiate the display of the email messages according to the group that is identified. For example, a user can scroll from the individual navigation region 114 down into the group navigation region 118 to select an identifier 120 as shown at 122. The position indicator 116 is shown displayed at 122 to indicate a selection of the media items that are grouped by a day, such as Wednesday in this example when the W identifier is selected from the group navigation region 118 by touch input. Accordingly, a list 124 or partial list of email messages 126 that correlate to the selected group of media items is displayed (e.g., shown as Wed_Items 1-6).

When a user scrolls by touch input with a thumb or finger into the group navigation region 118, the identifiers 120 of the groups of email messages have the appearance of shifting in an opposite direction to that of the touch input. For example, as a user scrolls down through the identifiers 120 from Thursday (Th) to Wednesday (W) to Tuesday (Tu) and so on, the next consecutive identifiers are scrolled up for display at a scroll rate that increases from the scroll rate by item, to a scroll rate by day, to a scroll rate by week, and so on to a scroll rate by month. In an implementation, the identifiers 120 are shifted up at a faster rate than the drag speed of the touch input so that the user can increase the scroll rate without lifting the contact of a touch input on the touch-screen.

In an implementation, the position indicator 116 moves down along with the touch input as the user drags a finger down approximately five pixels, and the identifiers Th, W, Tu, and M shift up in the variable rate scrollbar approximately 20 pixels to display the next consecutive identifier for Sunday (S) while the position indicator 116 is positioned over the Wednesday (W) identifier. Similarly, while the user drags a finger down approximately another five pixels, the identifiers W, Tu, M, and S all shift up in the variable rate scrollbar approximately 20 more pixels to display the next consecutive identifier for Saturday (Sa), and the position indicator 116 is positioned over the Tuesday (Tu) identifier. The identifiers 120 of the groups of email messages continue to shift up as a touch input scrolls down the variable rate scrollbar to display day identifiers that correlate to different day groups of media items, week identifiers that correlate to different week groups of the media items, and/or month identifiers that correlate to different month groups of the media items. This is described further with reference to the variable rate scrollbar 110 that is shown at 134.

The touch-screen driver 106 is implemented to detect a touch input to the variable rate scrollbar 110 in the individual navigation region 114 as an individual navigation of the email messages, and also to detect a touch input in the group navigation region 118 that initiates a display of a different group of the email messages. The variable rate scrollbar 110 is implemented for individual navigation of the email messages that are displayed and grouped according to any of a page for the current day, a past day, a week, and/or a month, and is also implemented for variable, group navigation to initiate the display of a different grouping of the email messages (e.g., a different past day, a week, or a month). The scrolling rate, or how fast a user can scroll media items, is changed or varied based on how a user can select individual media items, such as in a page view, and then jump to select a group of media items. Additionally, when a group of media items is selected, a user can then individually navigate the media items that are associated with the selected group of media items.

When a user selects an identifier 120 from the group navigation region 118 to initiate the display of the email messages according to the group that is identified, such as Wednesday in this example when the W identifier is selected at 122, and the user stops scrolling or lifts contact from the touch-screen, the variable rate scrollbar 110 can be segmented into various navigation regions. In this example, the variable rate scrollbar 110 is segmented into a top group navigation region 128 for faster group scrolling to email messages that were received in recent days (e.g., Thursday and Friday); a bottom group navigation region 130 for faster group scrolling to email messages that were received on previous days (e.g., Monday and Tuesday); and an individual navigation region 132 for individual navigation of the email messages that are displayed in the list 124 of email messages 126 that correlate to the currently selected group of email messages (e.g., Wednesday).

In various embodiments, the variable rate scrollbar 110 that is shown at 134 can include day identifiers 136 that correlate to different day groups of media items, week identifiers 138 that correlate to different week groups of the media items, and/or month identifiers 140 that correlate to different month groups of the media items. As similarly described above, a user can scroll through the various group identifiers in the navigation region of the variable rate scrollbar 110 to select an identifier as shown at 142. The position indicator 116 is shown displayed at 142 to indicate a selection of the media items that are grouped by a week when the week identifier 2W is selected from the group navigation region by touch input.

Accordingly, a list or partial list of media items that correlate to the selected group of media items can be displayed.

Figure 2:
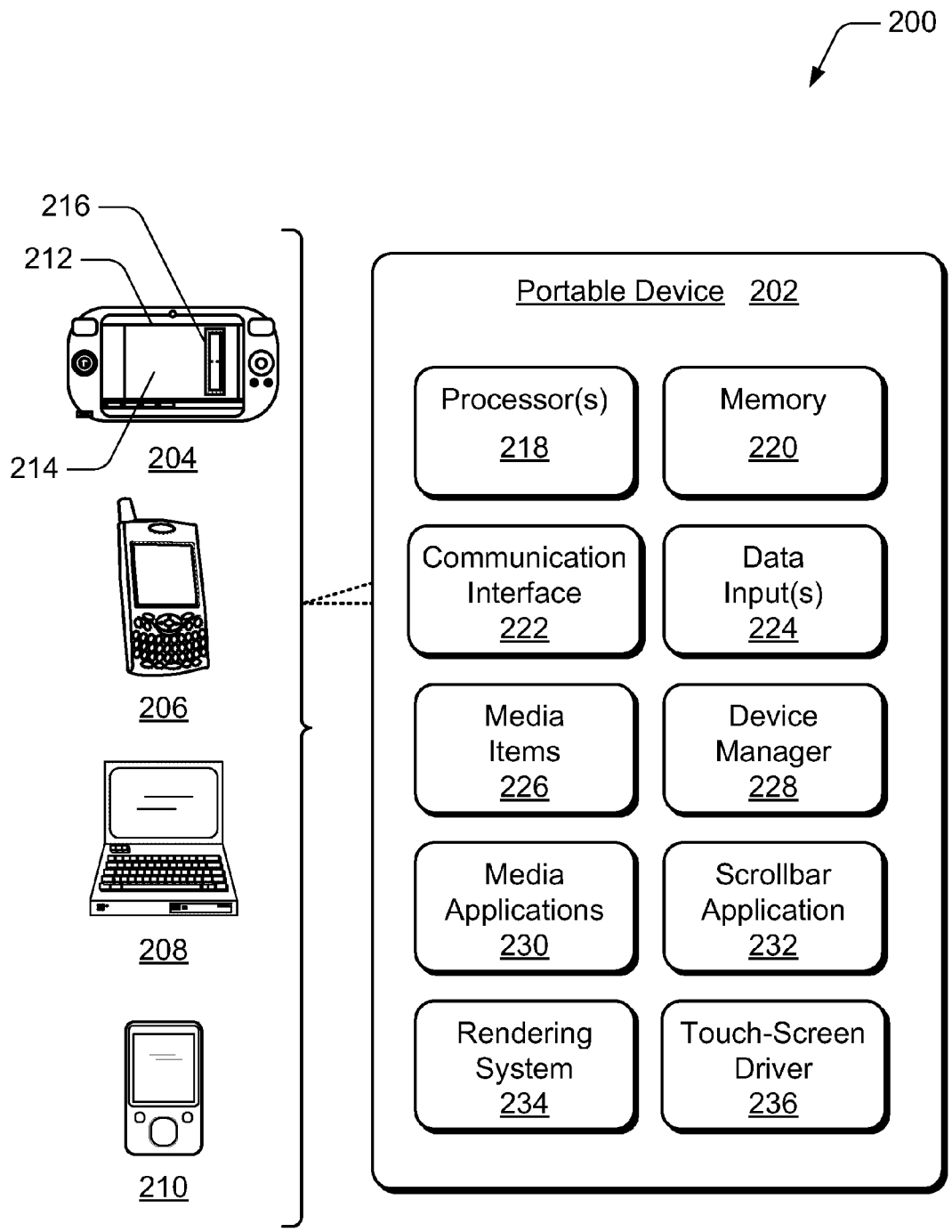
FIG. 2 illustrates an example system in which embodiments of a variable rate scrollbar can be implemented.

FIG. 2 illustrates an example system 200 in which various embodiments of a variable rate scrollbar can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 4. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a memory 220, a communication interface 222 for data, messaging, and/or voice communications, and data inputs 224 to receive media items 226 and/or media content. Media items can include any type of email messages, text messages, digital photos, song selections, and the like. Media content (e.g., to include recorded media content) can include any type of audio, video, and/or image data received from any media content or data source, such as messages, television media content, music, video clips, data feeds, interactive games, network-based applications, and any other content. Portable device 202 is implemented with a device manager 228 that includes any one or combination of a control application, software application, signal processing and control module, code that is native to the particular device, and/or a hardware abstraction layer for the particular device.

Portable device 202 includes various media applications 230 that may incorporate components such as a scrollbar application 232 that can be processed or otherwise executed by the processors 218. The media applications 230 can include a music and/or video player, a Web browser, an email application, a messaging application, a photo viewer, and the like. Portable device 202 includes a rendering system 234 to render user interfaces and a variable rate scrollbar from the scrollbar application 232 to generate a display on any of the portable devices. The rendering system 234 is also implemented to receive and render any form of audio, video, and/or image data received from any media content and/or data source. Portable device 202 also includes a touch-screen driver 236, such as described with reference to touch-screen driver 106 shown in FIG. 1, and with reference to embodiments of a variable rate scrollbar as described herein.

Example method 300 is described with reference to FIG. 3 in accordance with one or more embodiments of a variable rate scrollbar. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
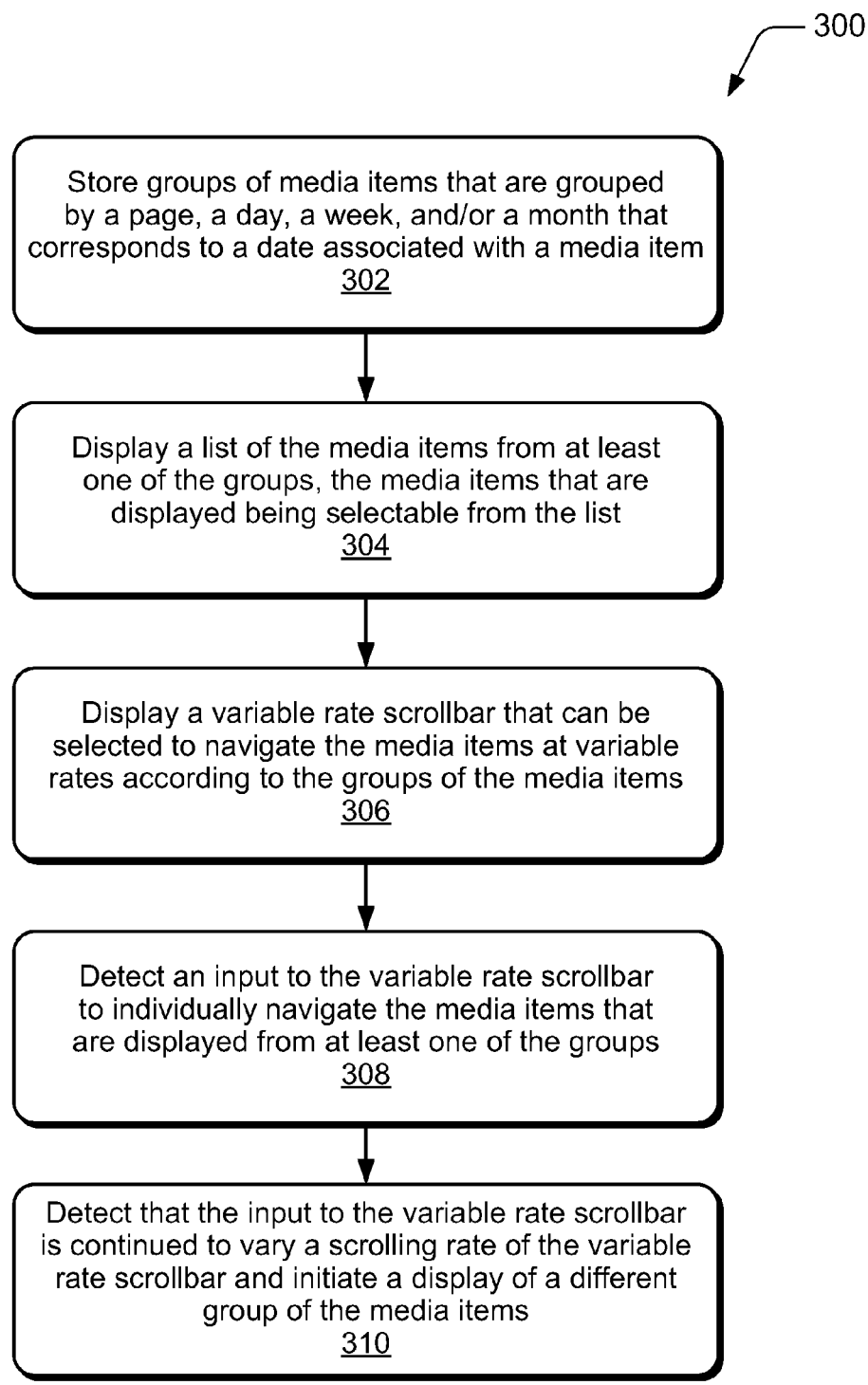
FIG. 3 illustrates example method(s) for a variable rate scrollbar in accordance with one or more embodiments.

FIG. 3 illustrates example method(s) 300 of a variable rate scrollbar. The order in which the method is described is not intended to be construed as a limitation, and any number of the described method blocks can be combined in any order to implement the method, or an alternate method.

At block 302, groups of media items are stored that are grouped by a page, a day, a week, and/or a month that corresponds to a date associated with a media item. For example, portable device 102 includes a memory to store groups of media items that are grouped by a page, a day, a week, and/or a month that corresponds to a date associated with a media item. Email messages and text messages can be grouped by the date when an email message or text message is received. Similarly, digital photos may be grouped by the date when a photo is taken and song selections may be grouped by the date when a song is downloaded. The portable device 102 can be utilized as a music and/or video player, for email communication, text messaging, as a photo viewer, as a portable phone for voice communication, and/or for many other applications.

At block 304, a list of the media items from at least one of the groups is displayed, and the media items that are displayed are selectable from the list of the media items. For example, a list or list of media items 112 are displayed on the touch-screen 104, such as email messages displayed in a page view of the email messages that have been received on a current day. The list of the email messages can be scrolled to display subsequent pages of additional email messages that are also received on the current day, and any of the email messages can be selected by a user from the list.

At block 306, a variable rate scrollbar is displayed that can be selected to navigate the media items at variable rates according to the groups of the media items. For example, the scrollbar application 108 at portable device 102 initiates a display of the variable rate scrollbar 110 on touch-screen 104 for user selection or manipulation to navigate the media items at variable rates according to the groups of the media items. The variable rate scrollbar 110 includes an individual navigation region 114 that a user selects and/or manipulates for individual navigation and selection of the media items. The variable rate scrollbar 110 also includes a group navigation region 118 that a user selects and/or manipulates for group navigation to initiate the display of a different group of media items. The variable rate scrollbar 110 also includes identifiers of the groups of media items, such as identifiers 120 of day groups of email messages, day identifiers 136 that correlate to different day groups of media items, week identifiers 138 that correlate to different week groups of the media items, and/or month identifiers 140 that correlate to different month groups of the media items.

At block 308, an input to the variable rate scrollbar is detected to individually navigate the media items that are displayed from at least one of the groups. For example, the touch-screen driver 106 at portable device 102 detects a touch input to the variable rate scrollbar 110 in the individual navigation region 114 as an individual navigation of media items that are displayed. At block 310, the continued input to the variable rate scrollbar is detected to vary a scrolling rate of the variable rate scrollbar and initiate a display of a different group of the media items. For example, the touch-screen driver 106 also detects that the touch input is continued, or scrolled, in the group navigation region 118 that initiates a display of a different group of the media items according to an identifier of a group of the media items that is selected.

Figure 4:
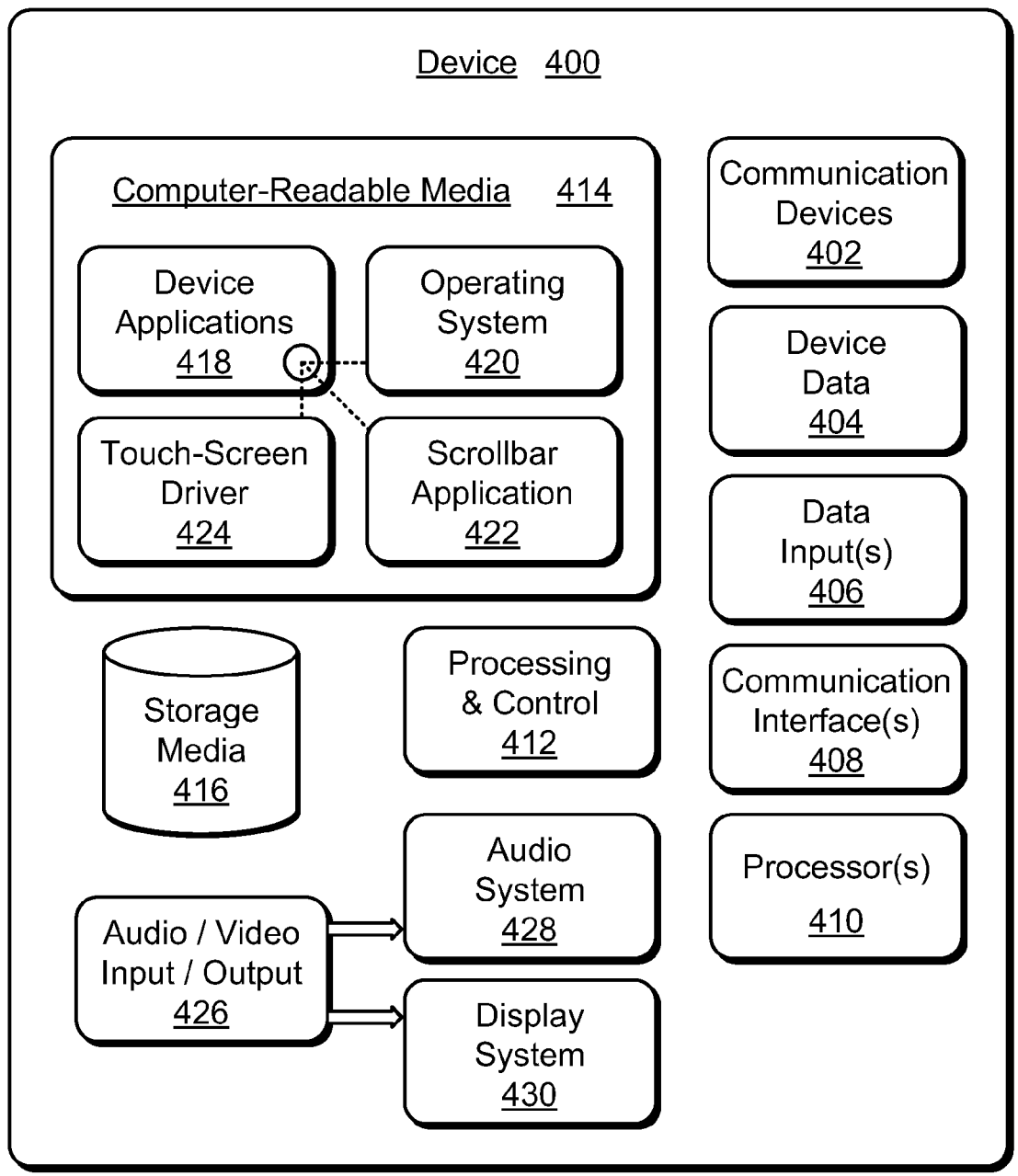
FIG. 4 illustrates various components of an example device that can implement embodiments of a variable rate scrollbar.

FIG. 4 illustrates various components of an example device 400 that can be implemented as any type of portable and/or computer device as described with reference to FIGS. 1 and 2 to implement embodiments of a variable rate scrollbar. Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like) which process various computer-executable instructions to control the operation of device 400 and to implement embodiments of a variable rate scrollbar. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager (e.g., a control application, software application, signal processing and control module, code that is native to a particular device, a hardware abstraction layer for a particular device, etc.). The device applications 418 also include any system components or modules to implement embodiments of a variable rate scrollbar. In this example, the device applications 418 include a scrollbar application 422 and a touch-screen driver 424 that are shown as software modules and/or computer applications. Alternatively or in addition, the scrollbar application 422 and the touch-screen driver 424 can be implemented as hardware, software, firmware, or any combination thereof.

Device 400 also includes an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, the audio system 428 and/or the display system 430 are implemented as external components to device 400. Alternatively, the audio system 428 and/or the display system 430 are implemented as integrated components of example device 400.

Although embodiments of a variable rate scrollbar have been described in language specific to features and/or methods, it is to be understood that the subject of the appended claims is not necessarily limited to the specific features or methods described. Rather, the specific features and methods are disclosed as example implementations of a variable rate scrollbar.

The invention claimed is:

1. A method implemented by a portable computer device, the method comprising:
   storing groups of media items that are grouped by at least one of a page, a day, a week, or a month that corresponds to a date associated with a media item;
   displaying a list of the media items from at least one of the groups, the media items that are displayed being selectable from the list;
   displaying a variable rate scrollbar configured for selection to navigate the media items at variable rates according to the groups of the media items;

detecting an input to the variable rate scrollbar to navigate individual identifiers in the variable rate scrollbar that represent the media items that are displayed from the at least one group; and varying a scrolling rate of the variable rate scrollbar to initiate a display of a different group of the media items based on detecting that the input is continued.

2. A method as recited in claim 1, wherein the variable rate scrollbar includes group identifiers of the groups of the media items, and wherein a group identifier is selectable to initiate a display of the media items according to the group that is identified.

3. A method as recited in claim 1, wherein the variable rate scrollbar includes an individual navigation region configured for individual navigation of the media items that are displayed from the at least one group, and further includes a group navigation region for group navigation to initiate a display of the different group of the media items.

4. A method as recited in claim 1, wherein the variable rate scrollbar is further configured for individual navigation of the media items that are displayed and grouped according to the day, and wherein the variable rate scrollbar is further configured for group navigation to initiate a display of the media items that are grouped according to at least one of the week or the month.

5. A method as recited in claim 1, wherein the variable rate scrollbar is further configured for individual navigation of the media items that are displayed and grouped according to the week, and wherein the variable rate scrollbar is further configured for group navigation to initiate a display of the media items that are grouped according to at least one of the day or the month.

6. A method as recited in claim 1, wherein the variable rate scrollbar is further configured for individual navigation of the media items that are displayed and grouped according to the month, and wherein the variable rate scrollbar is further configured for group navigation to initiate a display of the media items that are grouped according to at least one of the day or the week.

7. A method as recited in claim 1, wherein the media items are at least one of email messages or text messages, and wherein the date associated with an email message or a text message is a date when the email message or the text message is received.

8. A method as recited in claim 1, wherein the media items are at least one of digital photos or song selections.

9. A portable computer device, comprising:
at least a memory and a processor configured to implement a variable rate scrollbar configured for selection to navigate groups of email messages that are grouped by at least one of a page, a day, a week, or a month that corresponds to a date when an email message is received;
a touch-screen display configured to display a list of the email messages from at least one of the groups;
a scrollbar application configured to initiate a display of the variable rate scrollbar to navigate the email messages at variable rates according to the groups of the email messages; and
a touch-screen driver configured to detect a scrolling touch input on a portion of the touch-screen display as an input to the variable rate scrollbar for individual navigation of individual identifiers in the variable rate scrollbar that represent the email messages when displayed from at least one of the groups, and further configured to detect that the scrolling touch input is continued to vary a scrolling rate of the variable rate scrollbar to initiate a display of a different group of the email messages.

10. A portable computer device as recited in claim 9, wherein the variable rate scrollbar includes group identifiers of the groups of email messages, and wherein a group identifier is selectable to initiate the display of the email messages according to the group that is identified.

11. A portable computer device as recited in claim 9, wherein the variable rate scrollbar includes an individual navigation region configured for the individual navigation of the email messages when displayed from at least one of the groups, and further includes a group navigation region for group navigation to initiate the display of the different group of the email messages.

12. A portable computer device as recited in claim 9, wherein the variable rate scrollbar is further configured for individual navigation of the email messages that are displayed and grouped according to the day, and wherein the variable rate scrollbar is further configured for group navigation to initiate the display of the email messages that are grouped according to at least one of the week or the month.

13. A portable computer device as recited in claim 9, wherein the variable rate scrollbar is further configured for individual navigation of the email messages that are displayed and grouped according to the week, and wherein the variable rate scrollbar is further configured for group navigation to initiate the display of the email messages that are grouped according to at least one of the day or the month.

14. A portable computer device as recited in claim 9, wherein the variable rate scrollbar is further configured for individual navigation of the email messages that are displayed and grouped according to the month, and wherein the variable rate scrollbar is further configured for group navigation to initiate the display of the email messages that are grouped according to at least one of the day or the week.

15. Computer-readable media having stored thereon computer-executable instructions that, if executed by a portable computer device, initiate the portable computer device to:
store groups of media items that are grouped by at least one of a page, a day, a week, or a month that corresponds to a date associated with a media item;
initiate a display of a list of the media items from at least one of the groups, the media items that are displayed being selectable from the list;
initiate a display of a variable rate scrollbar configured for selection to navigate the media items at variable rates according to the groups of the media items;
detect a navigation input to the variable rate scrollbar to navigate individual identifiers in the variable rate scrollbar that individually represent the media items that are displayed from the at least one group; and
vary a scrolling rate of the variable rate scrollbar to initiate a display of a different group of the media items based on detection that the navigation input is continued.

16. Computer-readable media as recited in claim 15, wherein the computer-executable instructions, if executed, further initiate the portable computer device to display the variable rate scrollbar to include group identifiers of the groups of the media items, and wherein a group identifier is selectable to initiate a display of the media items according to the group that is identified.

17. Computer-readable media as recited in claim 15, wherein the computer-executable instructions, if executed, further initiate the portable computer device to display the variable rate scrollbar to include an individual navigation region configured for navigation of the individual identifiers in the variable rate scrollbar that individually represent the media items that are displayed from the at least one group, and to further include a group navigation region for navigation of group identifiers of the groups of the media items to initiate a display of a different group of the media items.

18. Computer-readable media as recited in claim 15, wherein the media items are at least one of email messages or text messages, and wherein the date associated with an email message or a text message is a date when the email message or the text message is received.

* * * * *